United States Patent
O'Neill

[11] Patent Number: 6,131,606
[45] Date of Patent: Oct. 17, 2000

[54] MOVING CHECK VALVE SEAT PROVIDING HIGH PRESSURE RELIEF

[75] Inventor: William N. O'Neill, East Peoria, Ill.

[73] Assignee: Caterpillar Inc., Peoria, Ill.

[21] Appl. No.: 09/336,914

[22] Filed: Jun. 21, 1999

[51] Int. Cl.⁷ .................................................. F16K 31/12
[52] U.S. Cl. .......................................... 137/495; 137/508
[58] Field of Search ..................................... 137/495, 508, 137/509; 251/129.03, 129.14, 129.15

[56] References Cited

U.S. PATENT DOCUMENTS

| | | | |
|---|---|---|---|
| 2,804,881 | 9/1957 | Seid et al. ................................. | 137/508 |
| 3,183,040 | 5/1965 | Gold ........................................ | 137/508 |
| 3,792,715 | 2/1974 | Parrett et al. ............................ | 137/493 |
| 4,237,923 | 12/1980 | Pressaco .................................. | 137/495 |
| 4,500,035 | 2/1985 | Kuroda et al. .......................... | 236/92 B |
| 4,561,468 | 12/1985 | Kreitchman et al. ................. | 137/625.5 |
| 4,592,533 | 6/1986 | Guglielmi et al. ..................... | 251/30.01 |
| 4,596,271 | 6/1986 | Brundage ................................. | 137/540 |
| 4,699,351 | 10/1987 | Wells ........................................ | 251/29 |
| 4,848,721 | 7/1989 | Chudakov ............................ | 251/30.02 |
| 4,964,611 | 10/1990 | Anderson ............................. | 251/30.02 |
| 5,301,920 | 4/1994 | Ichiki ..................................... | 251/30.04 |
| 5,328,147 | 7/1994 | Stobbs ................................... | 251/30.02 |
| 5,421,545 | 6/1995 | Schexnayder ........................ | 251/30.02 |
| 5,645,263 | 7/1997 | Aardema ............................... | 251/30.02 |
| 5,878,647 | 3/1999 | Wilke et al. ............................. | 91/445 |

*Primary Examiner*—John Fox
*Attorney, Agent, or Firm*—Howard & Howard

[57] ABSTRACT

A fluid control device is disclosed which is capable of permitting flow through the fluid control device in response to a control signal and in response to a predetermined high pressure. The fluid control device includes a valve body having a first end, a second end, and a bore extending between the first end and the second end. A plurality of inlet ports extend from the valve body into the bore. A moveable sleeve is located within the bore and includes a check valve seat. A valve rod extends from the first end of the valve body into the sleeve and sealingly engages the check valve seat. The sleeve and associated check valve seat is moveable out of sealing engagement with the valve rod in response to a predetermined pressure within the inlet ports. In addition, the valve rod can be moved out of sealing engagement with the check valve seat in response to actuation of a solenoid armature that is in contact with the valve rod. Thus, the fluid control device includes two mechanisms for permitting flow of fluid through the fluid control device.

20 Claims, 3 Drawing Sheets

Fig-2-

MOVING CHECK VALVE SEAT PROVIDING HIGH PRESSURE RELIEF

This invention was made with Government support under Agreement No. MDA972-94-3-0015 awarded by ARPA. The Government has certain rights to this invention.

TECHNICAL FIELD

This invention relates generally to a fluid control device and, more particularly, to a fluid control device having a moveable check valve seat that functions both to control fluid flow through the device and to provide a high pressure relief flow of fluid through the device.

BACKGROUND ART

Fluid control devices related to the present invention are generally used in hydraulic control systems. A basic hydraulic control system includes a hydraulic cylinder for receiving hydraulic fluid and a piston that is moveably mounted inside the cylinder. Flow of hydraulic fluid into and out of the cylinder alters the pressure in the cylinder and thereby controls movement of the piston relative to the cylinder. Movement of the piston is typically used to control movement of a mechanical device, for example, a blade on a motor grader. Flow of hydraulic fluid out of the cylinder is generally accomplished by using a check valve. In addition, generally a pilot pressure operated relief valve is also connected to the cylinder to provide induced high pressure relief.

One problem associated with hydraulic cylinders is cylinder drift. Cylinder drift occurs when fluid leaks from the pressurized hydraulic cylinder. Cylinder drift tends to occur when the check valve is mounted near the main hydraulic valve to the cylinder.

One solution to minimizing cylinder drift has been to mount the check valve directly to the hydraulic cylinder. A cylinder mounted check valve acts as a lock to minimize fluid leakage and as a result it minimizes cylinder drift. One difficulty with the current cylinder mounted check valves is that they require routing of hydraulic pilot pressure control lines from the main valve to the cylinder mounted check valve. This routing of hydraulic pilot pressure control lines can make assembly difficult. In addition, there is a potential for failure of the hydraulic lines connected between the main valve and the cylinder mounted check valve.

One additional difficulty associated with hydraulic cylinders is that on occasion the pressure within the cylinder is elevated to an undesirably high level. Therefore, it is also typical to include a high pressure relief valve that is activated during these undesirable high pressure periods. The pressure relief valve adds additional complexity to the assembly of the hydraulic cylinder. U.S. Pat. No. 4,848,721, issued Jul. 18, 1989, discloses a solenoid controlled pilot operated valve in which the valve elements are grouped into main and pilot sections including a combined seal-bearing means surrounding the main valve member and a solenoid coil integrated into the main valve member.

The present invention is directed to overcoming one or more of these problems as set forth above.

DISCLOSURE OF THE INVENTION

One aspect of the invention is a fluid control device which includes, a valve body having a first end opposite a second end. A bore is defined with the valve body and extends from the first end to the second end. A solenoid armature contacts a valve rod which extends into a sleeve located in the bore. The valve rod is moveable between a first valve rod position and a second valve rod position by the solenoid armature. The sleeve is in a fluid tight engagement with the bore and includes a check valve seat defined within the sleeve. The valve rod is in sealing contact with the check valve seat when the valve rod is at the first valve rod position. The valve rod is not in sealing contact with the check valve seat when it is at the second valve rod position.

Another aspect of the invention is a method for controlling the flow of fluid through a valve. The method includes the steps of providing a valve body having a bore extending from a first end of the valve body to a second end of the valve body, locating a moveable sleeve having a first end and a second end within the bore, and locating a check valve seat within the sleeve between the first end and the second end, locating a valve rod within the sleeve in operative communication with the check valve seat, biasing the sleeve into a first sleeve position to engage the valve rod at a first valve rod position against the check valve seat when the sleeve is biased into the first sleeve position to prevent fluid flow through the second end of the valve body, and introducing into said bore through at least one inlet port located adjacent the first end of the sleeve a predetermined fluid pressure having a force greater than the force biasing the sleeve into the first sleeve position to move the sleeve to a second sleeve position wherein the valve rod does not sealingly engage the check valve seat.

BEST MODE FOR CARRYING OUT THE INVENTION

Figure 1:
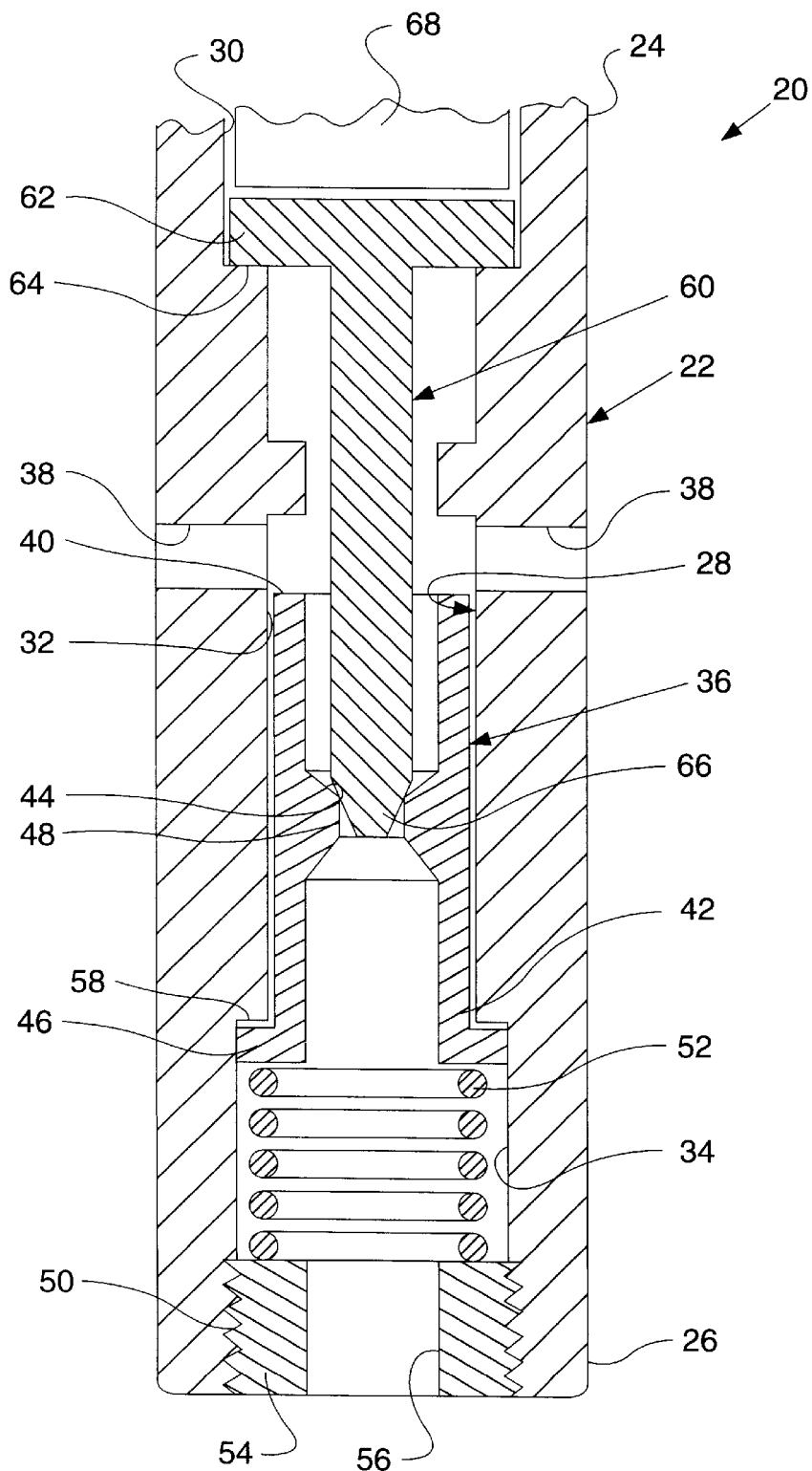
FIG. 1 is a cross-sectional view of a fluid control device designed in accordance with the present invention showing a valve rod at a first valve rod position and a sleeve at a first sleeve position.

Referring now to FIG. 1, a cross-sectional view of a fluid control device is shown generally by numeral 20. Fluid control device 20 includes a valve body 22 having a first end 24 opposite a second end 26 and a bore 28 extending between first end 24 and second end 26. Bore 28 includes an upper chamber 30 in fluid communication with a central chamber 32 and a lower chamber 34. A sleeve 36 is moveably mounted within central chamber 32 of bore 28. Sleeve 36 is slideable within bore 28 and is in a fluid-tight fit with bore 28. Sleeve 36 also extends into lower chamber 34. A plurality of inlet ports 38 extend into valve body 22 and are in fluid communication with bore 28.

Sleeve 36 includes a first end 40 opposite a second end 42 and a check valve seat 44 located between first end 40 and second end 42. Second end 42 further includes a flange 46. An internal constriction 48 within sleeve 36 defines check valve seat 44.

The second end 26 of valve body 22 includes a threaded aperture 50 adjacent to lower chamber 34. A spring 52 is received in lower chamber 34. An adjustable spring retainer 54 is received in threaded aperture 50 and retains spring 52 between itself and second end 42 of sleeve 36. Adjustable spring retainer 54 also includes an outlet port 56 that is generally concentric with bore 28. Spring 52 biases sleeve 56 toward first end 24 of valve body 22 into a first sleeve position. Bore 28 includes a shoulder 58 that contacts flange 46 of sleeve 36 in response to the biasing of spring 52.

A valve rod 60 is received in upper chamber 30 and extends into sleeve 36. Valve rod 60 includes a head portion 62 opposite a tapered end 66. Head portion 62 contacts a shoulder 64 defined in bore 28 and limits movement of valve rod 60 toward second end 26 of valve body 22 when valve rod 60 is at a first valve rod position. When valve rod 60 is at the first valve rod position and sleeve 36 is at first sleeve position, then tapered end 66 is received in a sealing engagement against check valve seat 44, as shown in FIG. 1. A solenoid armature 68 contacts valve rod 60 in upper chamber 30.

As discussed above, valve rod 60 is illustrated at the first valve rod position and sleeve 36 is shown at the first sleeve position, as shown in FIG. 1. Rotation of adjustable spring retainer 54 adjusts the biasing force of spring 52 against sleeve 36. When the valve rod 60 and sleeve 36 are in the positions shown in FIG. 1, there is no flow between inlet ports 38 and outlet port 56.

Figure 2:
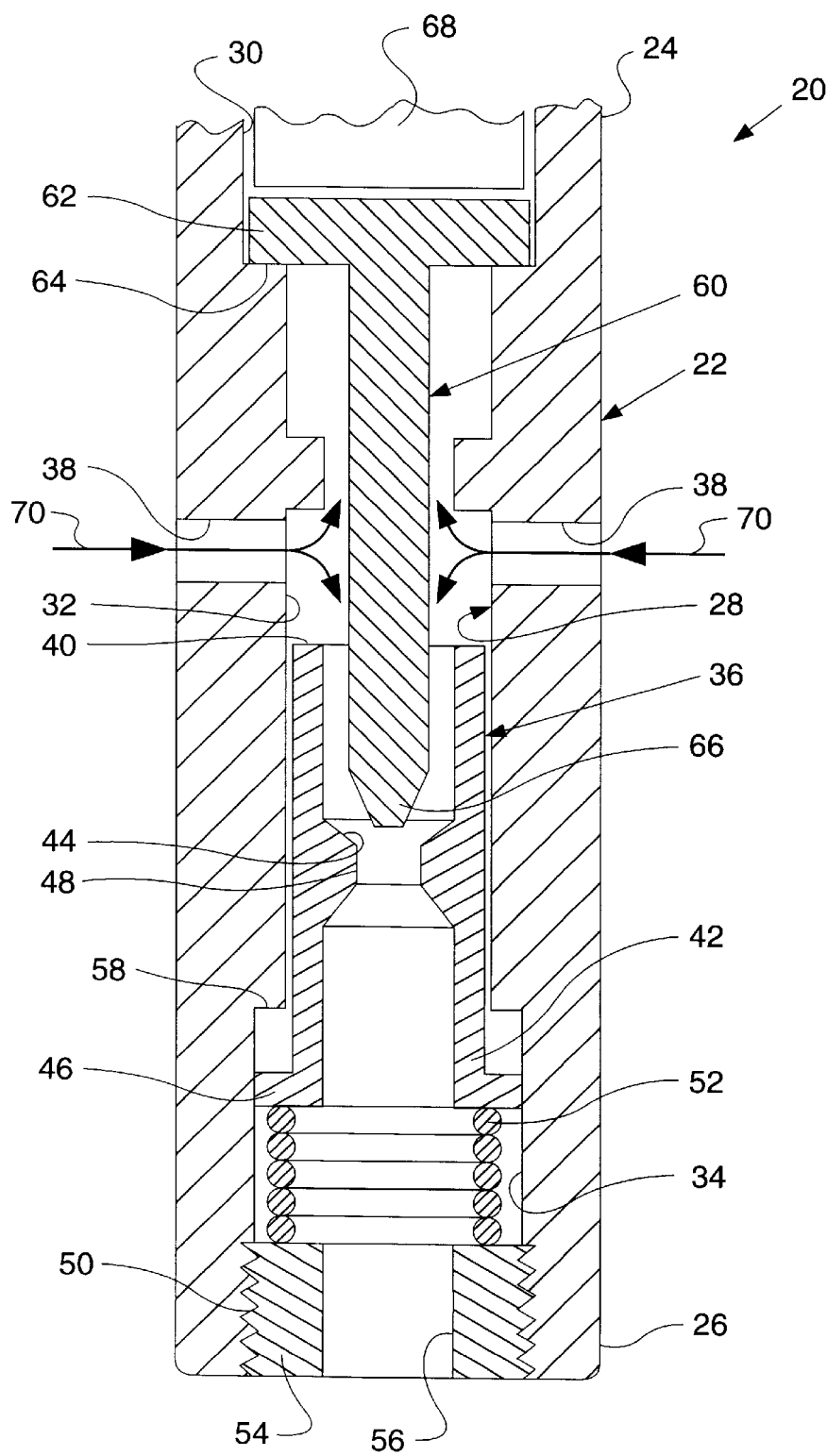
FIG. 2 is a cross-sectional view of the fluid control device shown in FIG. 1 when the sleeve has been moved to a second sleeve position.

As shown in FIG. 2, fluid control device 20 is shown under a condition where inlet ports 38 are providing a high pressure, designated by arrows 70, into bore 28. When the pressure through inlet ports 38 is of a sufficient force to exceed the biasing force of spring 52, sleeve 36 is then moved from the first sleeve position, as shown in FIG. 1, to a second sleeve position, as shown in FIG. 2. When sleeve 36 is at the second sleeve position then check valve seat 44 is moved out of sealing engagement with tapered end 66 of valve rod 60. Thus, when sleeve 36 is at the second sleeve position then fluid communication is established between inlet ports 38 and outlet port 56. In this condition, fluid is able to flow from inlet port 38 through outlet port 56 until the pressure of the fluid in inlet port 38 drops below the biasing force of spring 52. When the biasing force of spring 52 exceeds the pressure of fluid in inlet ports 38 then sleeve 36 is moved back to first sleeve position, as shown in FIG. 1. Thus, sleeve 36 and spring 52 provide a means for automatic high pressure relief through valve body 22.

Figure 3:
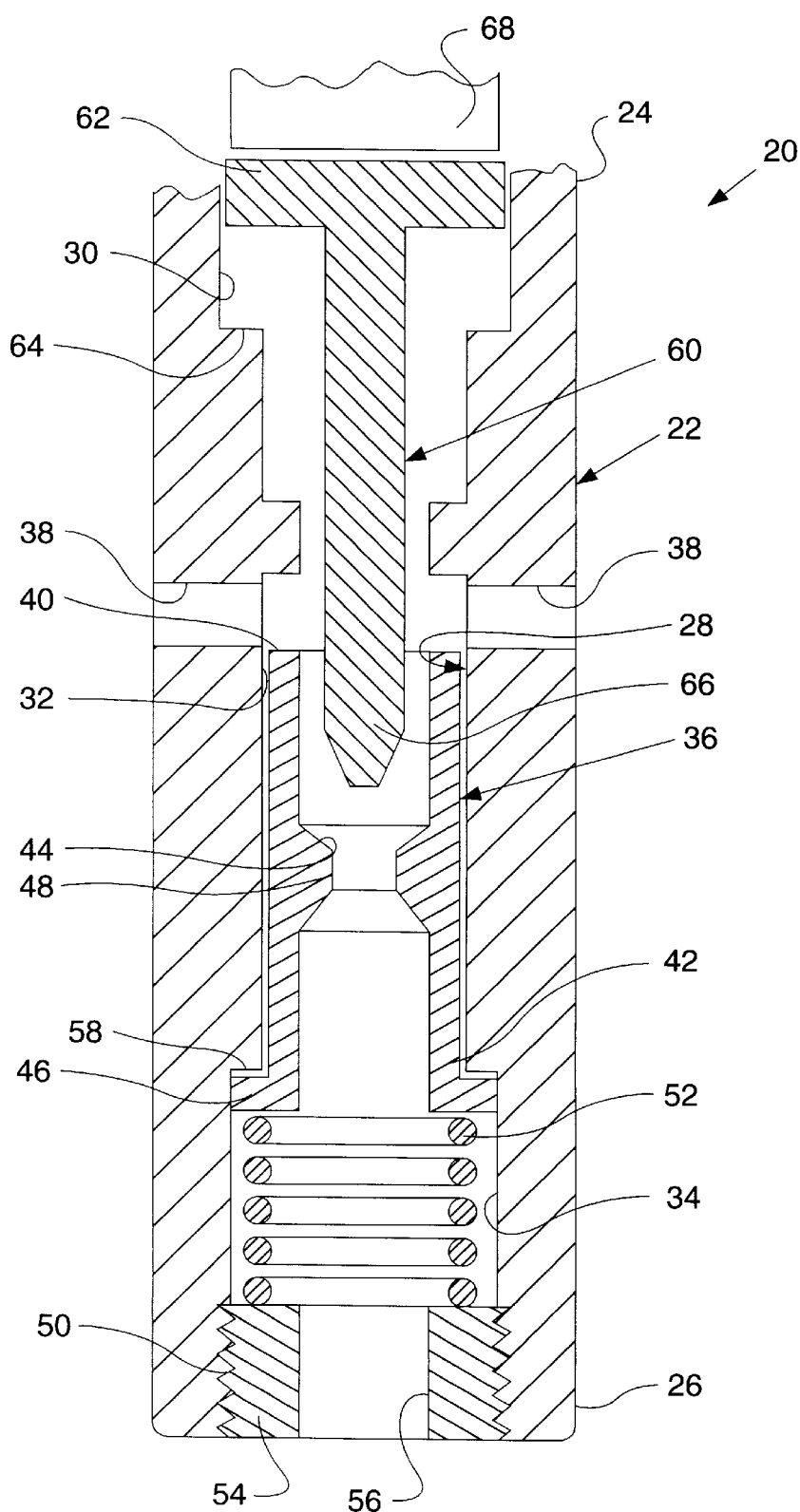
FIG. 3 is a cross-sectional view of the fluid control device shown in FIG. 1 when the valve rod is moved to a second valve rod position.

In FIG. 3, valve rod 60 is shown at a second valve rod position. Activation of solenoid armature 68 by an electrical signal through wires (not shown), as is known in the art, moves valve rod 60 from the first valve rod position, as shown in FIG. 1, to the second valve rod position as shown in FIG. 3. When valve rod 60 is at the second valve rod position then tapered end 66 is moved out of sealing engagement with check valve seat 44 and inlet ports 38 are in fluid communication with outlet port 56. Thus, when solenoid armature 68 is actuated then fluid can flow from inlet ports 38 through sleeve 36 and out outlet port 56.

INDUSTRIAL APPLICABILITY

A fluid control device 20 is disclosed for controlling flow of fluid through a valve body 22. The fluid control device 20 includes a valve rod 60 that is moveable between a first valve rod position and a second valve rod position. Valve body 22 further includes a sleeve 36 that is moveable in a fluid tight manner within a bore 28 defined in valve body 22. Sleeve 36 is moveable between a first sleeve position and a second sleeve position. When the valve rod 60 is at the first valve rod position and sleeve 36 is at the first sleeve position the valve rod 60 is in sealing engagement with a check valve seat 44 in sleeve 36 and fluid flow through the valve body 22 is prevented. When either the sleeve 36 is at the second sleeve position or valve rod 60 is at the second valve rod position, fluid flow through valve body 22 is enabled.

In a typical use, valve body 22 includes at least one inlet port 38 in communication with the bore 28 and connected to a hydraulic cylinder (not shown) and control of hydraulic fluid out of the hydraulic cylinder would be regulated by the condition of sleeve 36 or valve rod 60. Under normal operating conditions, pressure within the hydraulic cylinder would be reduced when a solenoid armature 68 connected to the valve rod 60 receives an electrical signal from a hand operated control (not shown). The electrical signal actuates a solenoid armature 68 and moves valve rod 60 from first valve rod position to the second valve rod position wherein the valve rod 60 is not in sealing engagement with the check valve seat 44 located in sleeve 36. Thus, normally the flow of fluid out of the cylinder is under the control of the solenoid armature 68. Under conditions where the pressure within the hydraulic cylinder exceeds a predetermined force this fluid pressure would enter valve body 22 through inlet ports 38 and move sleeve 36 from the first sleeve position to the second sleeve position wherein valve check seat 44 is not in sealing engagement with valve rod 60. Thus, a high pressure condition could be relieved since when sleeve 36 is at the second sleeve position there is fluid communication between inlet ports 38 and an outlet port 56 in valve body 22. Such high pressure conditions can result from high pressure spikes in the hydraulic system These high pressure conditions must be relieved to prevent damage to the hydraulic system.

What is claimed is:

1. A fluid control device comprising:

a valve body having a first end opposite a second end;

a bore defined within said valve body and extending from said first end to said second end;

a solenoid armature contacting a valve rod extending into a sleeve located in said bore, said valve rod moveable between a first valve rod position and a second valve rod position by said solenoid armature;

said sleeve in a fluid tight engagement with said bore and having a check valve seat defined within said sleeve; and said valve rod in sealing contact with said check valve seat when at said first valve rod position and said valve rod not in sealing contact with said check valve seat when at said second valve rod position.

2. A fluid control device as defined in claim 1, wherein said sleeve is moveable between a first sleeve position and a second sleeve position, said check valve seat in sealing contact with said valve rod when said sleeve is at said first sleeve position and said valve rod is at said first valve rod position and, said check valve seat not in sealing contact with said valve rod when said sleeve is at said second sleeve position.

3. A fluid control device as defined in claim 2, further including a spring, said spring biasing said sleeve into said first sleeve position.

4. A fluid control device as defined in claim 3, further including an adjustable spring retainer, said adjustable spring retainer adjusting said biasing of said sleeve into said first sleeve position by said spring.

5. A fluid control device as defined in claim 4, wherein said adjustable spring retainer further includes an outlet port that is concentric with said bore of said valve body.

6. A fluid control device as defined in claim 3, further including at least one inlet port in fluid communication with said bore and said sleeve having a first end opposite a second end, said spring located adjacent said second end of said sleeve and said at least one inlet port located adjacent said first end of said sleeve.

7. A fluid control device as defined in claim 6, wherein said second end of said sleeve includes a flange and said bore of said valve body includes a shoulder, said flange contacting said shoulder when said sleeve is at said first sleeve position.

8. A fluid control device as defined in claim 1, wherein said sleeve includes a first end opposite a second end and an internal constriction positioned between said first end and said second end of said sleeve, said internal constriction defining said check valve seat.

9. A fluid control device as defined in claim 1, wherein said valve rod includes a tapered end, said tapered end in sealing contact with said check valve seat when said valve rod is at said first valve rod position.

10. A fluid control device adapted for use with a solenoid actuator having a solenoid armature, the fluid control device comprising:
   a valve body having a first end and a second end;
   a bore defined within said valve body and extending from said first end to said second end; and
   a moveable sleeve located within said bore, said moveable sleeve having a check valve seat defined therein, said check valve seat in sealing engagement with a valve rod.

11. A fluid control device as defined in claim 10, wherein said sleeve is moveable between a first sleeve position and a second sleeve position, and said check valve seat in sealing contact with said valve rod when said sleeve is at said first sleeve position and said valve rod is at a first valve rod position and, said check valve seat not in sealing contact with said valve rod when said sleeve is at said second sleeve position.

12. A fluid control device as defined in claim 11, further including a spring, said spring biasing said sleeve into said first sleeve position.

13. A fluid control device as defined in claim 12, further including an adjustable spring retainer, said adjustable spring retainer adjusting said biasing of said sleeve into said first sleeve position by said spring.

14. A fluid control device as defined in claim 13, wherein said adjustable spring retainer further includes an outlet port that is concentric with said bore of said valve body.

15. A fluid control device as defined in claim 12, further including at least one inlet port in fluid communication with said bore and said sleeve having a first end opposite a second end, said spring located adjacent said second end of said sleeve and said at least one inlet port located adjacent said first end of said sleeve.

16. A fluid control device as defined in claim 15, wherein said second end of said sleeve includes a flange and said bore of said valve body includes a shoulder, said flange contacting said shoulder when said sleeve is at said first sleeve position.

17. A method for controlling flow of a fluid through a valve comprising the steps of:
   providing a valve body having a bore extending from a first end of the valve body to a second end of the valve body;
   locating a moveable sleeve having a first end and a second end within the bore, and locating a check valve seat within the sleeve between the first end and the second end;
   locating a valve rod within the sleeve in operative communication with the check valve seat;
   biasing the sleeve into a first sleeve position to engage the valve rod at a first valve rod position against the check valve seat when the sleeve is biased into the first sleeve position to prevent fluid flow through the second end of the valve body; and
   introducing into said bore through at least one inlet port located adjacent the first end of the sleeve a predetermined fluid pressure having a force greater than the force biasing the sleeve into the first sleeve position to move the sleeve to a second sleeve position wherein the valve rod does not sealingly engage the check valve seat.

18. A method as defined in claim 17, wherein the step of biasing the sleeve into a first sleeve position further includes the steps of locating a spring between an adjustable spring retainer and the second end of the sleeve and adjusting the biasing force of the sleeve into the first position with the adjustable spring retainer.

19. A method as defined in claim 17, wherein the step of biasing the sleeve into a first sleeve position further includes the steps of positioning a solenoid armature adjacent the first end of the valve body, engaging the valve rod with the solenoid armature and moving the valve rod to the first valve rod position, to thereby sealingly engage the valve rod with the check valve seat.

20. A method as defined in claim 19, further including the steps of actuating the solenoid armature to move the valve rod to a second valve rod position wherein the valve rod is not in sealing engagement with the check valve seat.

* * * * *